Patented May 30, 1933

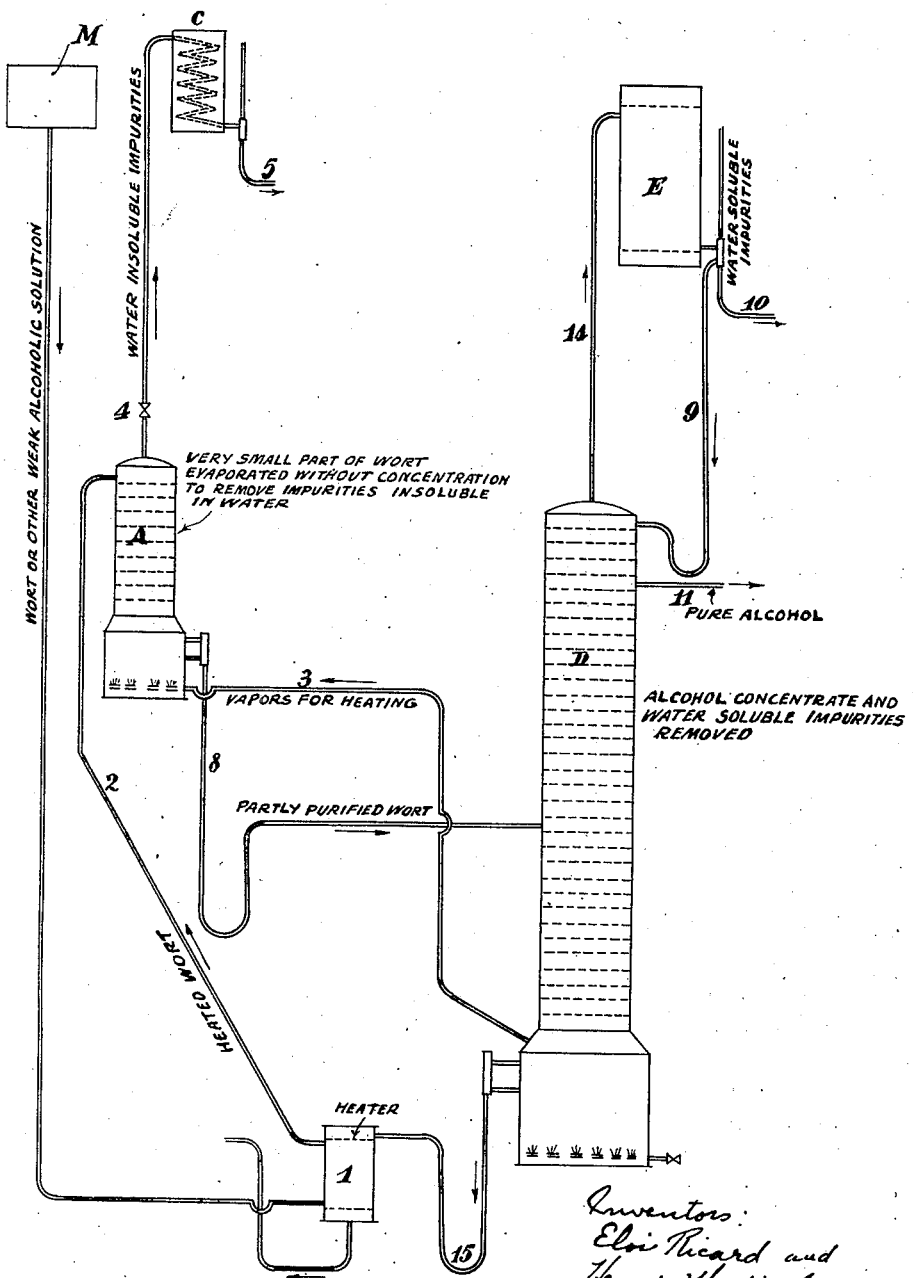

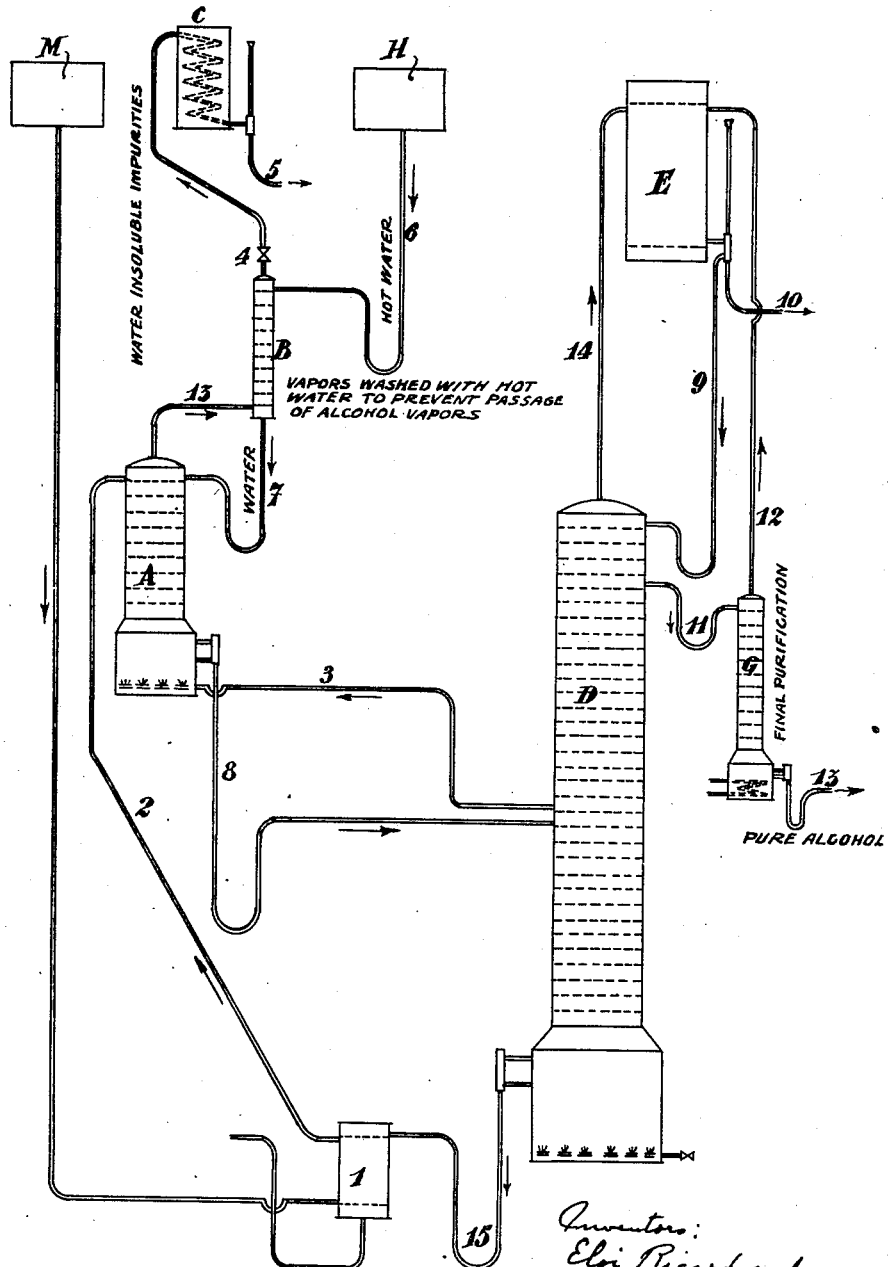
Fig:2

1,912,010

UNITED STATES PATENT OFFICE

ELOI RICARD AND HENRI MARTIN GUINOT, OF MELLE, FRANCE, ASSIGNORS TO SOCIETE ANONYME DES DISTTILLERIES DES DEUX-SEVRES, OF MELLE, FRANCE, A CORPORATION OF FRANCE

DIRECT RECTIFYING PROCESS FOR THE PRODUCTION OF PURE ALCOHOL

Application filed May 19, 1930, Serial No. 453,524, and in Austria August 2, 1929.

It is known that there are many types of rectifying apparatus which make it possible to treat fermented worts, wines, or weak alcoholic dilutions, in order to extract therefrom pure alcohol.

However, in spite of the great diversity of the proposed systems, modern apparatus have all in common the fact that they are based on the two following fundamental principles:—

1. They first carry out a purification, called low degree purification, in order to eliminate the volatile impurities. Said impurities are obtained diluted in alcohol at the top of a column generally called "purifying column", wherefore their name of head products.

2. They next carry out a purification, called high degree purification in a "rectifying column" in order to separate the heavy impurities called fusel oils; the latter are extracted mixed with a relatively important proportion of alcohol in an intermediate part of the concentrating column, generally at a point where the strength of the alcohol on the plates reaches 40 to 70° GL. wherefore their name of "tailings". All writers on the question concur in insisting on the absolute necessity of producing, during that step, an alcohol having a very great strength, 96°, 5 GL., for instance; otherwise, the oils ascend in the column together with the pure alcohol, and give it a disagreeable smell. However high the strength of alcohol is maintained, this purification is but more or less perfect, and it is never complete.

In order to obtain the high degree to which this purification must be carried out, it is necessary to use columns comprising a great number of plates, or combinations of complicated apparatus, and in most cases, to spend much more steam than would be necessary for extracting all the alcohol from the wort which is treated.

Lastly, it is admitted that the apparatus which does not comprise both methods of purification, as above mentioned, can give but roughly purified alcohol.

The present invention relates to a new process and to a simple apparatus, making it possible to obtain directly remarkably pure alcohols from fermented worts, wines or weak alcoholic dilutions, without any need of bringing the alcohol to a great strength as in the ordinary rectification.

In the present specification, the use of the terms head products and tailings will be systematically avoided.

This invention, indeed, is based on principles which are opposed to all that has been said hitherto, on account of the fact that the purification at a low degree is effected with very low percentages of alcohol, preferably below 20° Gay-Lussac, and that, instead of trying to eliminate the volatile impurities, one eliminates entirely and easily the water insoluble impurities, including a part of the heavy impurities. For that purpose use is made of the fact that the heavy impurities can, in certain cases, behave like volatile products, a fact that had been discovered for some of them, such as the ethyl insovalerianate, but in different conditions; and hitherto, nobody had ever thought of systematically utilizing said property.

Said low degree purification is also characterized by the fact that the operation is effected by vaporizing a very small part of the feed liquids, not by acting on the whole of the alcoholic vapours of the worts, and that any concentration of the alcohol is systematically avoided, on account of the absence of concentrating plates and of any retrograding circulation, while, previously, the purification at a low degree was always effected simultaneously with a certain concentration of the alcohol, which sometimes was even provoked.

In a second part of the apparatus, the alcohol is concentrated by distillation, and, at the same time, the purification in respect to volatile products is completed by one of the processes known and applied in the distilling industry.

According to the invention, the fermented wort, the wine, or the weak alcoholic dilution containing generally from 1 to 20% of alcohol passes through the whole length of a column containing a small number of plates, said liquid travelling from top to bottom. It is heated to the boiling point before it enters said column, or during its passage through it, by any suitable means. A small part of the liquid that passes through said column is vaporized.

The vapors which are produced are directly condensed or before being condensed, they are passed through a small accessory column comprising a small number of plates which are sprinkled on their upper faces with a current of very hot water. The liquid that is obtained through condensation of said vapours is substantially free from alcohol, and contains the whole of the heavy products called "fusel oils", together with a part of the volatile impurities. Said liquid is not sent back into the column; it is decanted, if necessary, and stored with a view to extract subsequently the heavy esters and the higher alcohols.

The whole of the column, the accessory small column, and the condenser, arranged for the purification of the feed liquid before the latter is submitted to the distillation of the alcohol, is called "hydroselector".

The fermented worts, wines, or weak alcoholic solutions flowing from the bottom of the hydroselector, contain, in addition to their original alcohol, the remainder of the volatile impurities. They enter a distilling column in order that the alcohol be distilled, and the remaining volatile impurities eliminated by the ordinary means.

In fact, the process according to the invention is not characterized by the terminal operations of distillation and purification, but by their combination with the pre-purification of the fermented wort, wine, or weak alcoholic dilution in the hydroselector apparatus in order to remove the whole of the water insoluble impurities and a part of the volatile water insoluble impurities.

That combination has a direct influence on the results obtained, not only through the quality of the alcohol, which is obtained in a strictly pure state, and not only through the yield of the operation, since about 98% of the alcohol present in the fermented wort, wine or weak alcoholic dilution is recovered, but also because the extraction of the last volatile impurities does not require the obtaining of an alcohol of a very great strength. It is therefore not necessary that the distilling column should have a great number of concentrating plates, and consequently, said column consumes but the quantity of vapour which is necessary for the extraction of alcohol from the wort.

It should be well understood that the part of the weak alcoholic liquid must be vaporized must be very small, approximating 0.5% of the wort that is treated. That proportion may be slightly different, but, in practice, it is not superior to 3% of the quantity of the initial liquid that is treated. Such a vaporization is indeed sufficient in order that the azeotropic mixtures formed by water and the impurities that are insoluble or not very soluble in water be expelled from the liquid that is treated. On the other hand, in order to obtain a good purification of alcohol, it is not necessary, in that first operation, to vaporize such a quantity of liquid that the whole of the tail impurities be driven out together with the whole of the head impurities.

There is no proportional relation between the quantity of liquid that is vaporized and the initial percentage of alcohol in the liquid that has been treated.

Concerning the operating mode of the process in which an abundant dilution is used, it has been found that said sprinkling must be such that the vapours are really washed by water.

Said operation must not be confused with the known operation which consists in making addition of fermented worts or hot water the sole purpose of which is to prevent the percentage of alcohol from increasing.

There are, between these two operations, essential differences which may serve to characterize the invention.

In the already known process:
1. The alcoholic concentrations are the same on the plates where the raw materials are fed as on the plates where water arrives.
2. The temperatures are the same on these plates.
3. The vapours that arise from the plate where the arrival of water takes place, carry away alcohol, for their percentage of alcohol is much higher than that of the liquids on said plate, according to the tables of Sorel or of Groening.
4. One may use water which is just hot, taken, for instance, from the condensers.
5. The addition of water may be replaced by an addition of fermented worts or of wines.
6. There is an accumulation of impurities on the plates located in the vicinity of the water inlet.

In the process according to the present invention, on the contrary:—
1. The alcoholic concentration on the higher plate, where water arrives is zero, or substantially so, the washing action being supposed to be sufficient to bring back the ethylic alcohol toward the column bottom.
2. The temperature on the plate where water arrives is noticeably higher than the temperature on the plate where the feeding of raw material takes place, a paradoxical enough fact when compared with the ordinary condition of functioning in the columns.
3. The vapours that arise from the plate where water arrives contain substantially but products which are insoluble in water. After said vapours are condensed, the condensate is decanted, which is a characteristic of the process.

4. The washing water cannot be at any temperature. It must be at a high enough temperature for not stopping the azeotropic mixtures formed by bodies that are insoluble or not very soluble in water. Said temperature must have been reached before the entrance of said water in the column so that it be not necessary to reheat it artificially through an addition of calories coming from the bottom of the column which would result in a concentration of the alcohol on the upper plates, as it is well known. As a rule, said temperature generally approximates 95° C.

5. It is not possible to use, instead of water, fermented wort or an alcoholic liquid, even very weak, for, such a liquid, if it can prevent an increase of the alcoholic strength on the plates, cannot, on the other hand, effect the washing of the vapours, on account of the fact that said liquid can itself emit vapours the alcoholic content of which is substantially the same as the alcoholic content of the vapours to be washed.

6. There is no accumulation of impurities in any part of the apparatus, on account of the fact that the vapours of the azeotropic mixtures formed by the impurities pass through the zone of water sprinkling without being stopped, and are sent to the condenser where from they are discharged, and are never sent back into the column.

If the operation is effected according to the indications of the present specification, it will be recognized that, owing to the hydroselector, the whole of the impurities which are insoluble or not very soluble in water is eliminated and in addition some very volatile impurities are removed.

The alcohol coming from the hydroselector contains accordingly most of the impurities which are soluble in water. Said impurities are easily separated during the second part of the operation which consists in distilling and concentrating the alcohol and at the same time purifying it by known methods.

The following examples, together with the appended drawings, will serve to illustrate the invention.

Figure 1 is a diagrammatic view of an apparatus according to the invention.

Figure 2 shows a modified form of said apparatus.

The material is a beet wort containing 5% of alcohol. Said wort flows from tank M (Figure 1) through heater 1, heated, in the known way, by distillation products coming from distilling column D through pipe 15. The heated wort is then sent through pipe 2 into column A. If the required temperature is not reached in 1, the heating is completed by introducing, through pipe 3, vapour into the bottom of column A or in any other way. (Pipe 3 may take heating vapour from the bottom of column D or preferably in a zone higher than the bottom as shown in Figure 2). A small outflow of vapours, corresponding to 0.5% of the weight of the treated wort, is regulated through valve 4. Said vapours are condensed in condenser C; the resulting liquid flows through pipe 5, and contains the whole of the water insoluble impurities and a small part of the most volatile water soluble impurities.

Instead of sending the vapours directly into condenser C, it is generally preferable to send them through a pipe 13 into a small column B (Figure 2) through which they pass from bottom to top. From said column B they are sent to condense in condenser C, without being submitted to a backward circulation. Column B is fed, at its top, with a small current of very hot water coming from tank H through pipe 6, said water corresponding to about 5% of the treated wort, and passing through pipe 7 into column A.

The quantity of vapours produced in A, and the quantity of water passing through B, may vary in large proportions, the indications given in the present example permitting to effect a good purification.

The purified wort flowing from hydroselector A is delivered through pipe 8 into distilling column D, where it is distilled in the ordinary way. The alcoholic vapours pass through pipe 14 and are condensed in condenser E. A part is sent back to column D through pipe 9 and the other part is extracted through pipe 10 and consists of the water soluble impurities. The pure alcohol is extracted through pipe 11, some plates below the top of the column.

The impurities which are to be removed by the present process are those which are commonly encountered in alcoholic worts and the like.

In the hydroselector are removed all impurities which are insoluble in water, whatever their volatility or boiling point. Included in these are the heavy impurities. The following are given as examples of water insoluble impurities which may be removed at this stage of the process: normal propyl alcohol, isobutyl alcohol, isoamylalcohol, amyl alcohol, acetic esters of said alcohols and chiefly ethyl acetate; heavy esters such as pelargonates, caproates; aldehydes such as furfurol, crotonaldehyde, isobutyraldehyde, isovaleraldehyde, etc.

In the hydroselector are also removed a part of the volatile, water-soluble impurities, such as acetaldehyde, acetone, methyl alcohol, fatty amines, carbon dioxide, etc.

In the distillation column D, during concentration of the alcohol, the remainder of the volatile, water-soluble impurities, together with certain heavy water-soluble impurities such as glycerine, are removed.

The alcohol extracted through pipe 11 is generally very pure, from a chemical and organoleptic point of view. But, if for some particular reason, a last purification was necessary, it could be submitted to any complementary treatment. For instance it could be submitted to a very weak partial boiling in a small column G wherefrom the vapours would go, through pipe 12 into condenser E, and absolutely pure alcohol would be extracted through pipe 13.

Likewise, if it is wanted to obtain the head impurities, extracted in 10, in a more condensed form, they may be concentrated by the ordinary means.

Instead of feeding column A with a weak alcoholic liquid, it is possible, without departing from the spirit of the invention, to feed said column with a strong alcoholic liquid, which is changed into a weak dilution by increasing the quantity of hot water that is delivered into column A through column B.

The above described apparatus could also be used for treating methyl alcohol aqueous solutions of any kinds. It may be used in whole or in part, if need be, at a pressure different from atmospheric pressure, in order to facilitate heat recuperation, or for any other purpose.

Gay-Lussac degrees referred to in this specification are the expression of the percentage of alcohol by volume in the solution.

What we claim is:—

1. Process for obtaining pure alcohol from weak alcoholic liquids, which comprises first vaporizing a fraction of said alcoholic liquids not exceeding three per cent. of the whole mass, substantially without concentration of alcoholic vapors, so as to remove the water-insoluble impurities, and subsequently distilling and concentrating the liquids so as to remove the remaining impurities.

2. Process for obtaining pure alcohol from weak alcoholis liquids, which comprises first vaporizing a fraction of said alcoholic liquids not exceeding three per cent. of the whole mass while pouring thereon a sufficient quantity of sufficiently hot water to avoid any substantial concentration of alcoholic vapors and to permit removal of the water-insoluble impurities while preventing the passage of alcohol vapor, removing the vapors containing said impurities and subsequently distilling and concentrating the liquids, so as to remove the remaining impurities.

3. Process for obtaining pure alcohol from weak alcoholic liquids, which comprises first vaporizing a fraction of said alcoholic liquids not exceeding three per cent. of the whole mass while pouring thereon a sufficient quantity of sufficiently hot water to avoid any substantial concentration of alcoholic vapors and to permit removal of the water-insoluble impurities while preventing the passage of alcohol vapor, removing the vapors containing said impurities and condensing the same, removing the condensate resulting therefrom, and subsequently distilling and concentrating the liquids so as to remove the remaining impurities.

4. Process for obtaining pure alcohol from weak alcoholic liquids, which comprises first heating said liquids, vaporizing a portion not exceeding three per cent. of the whole mass, and removing these impure vapors, any substantial concentration of alcoholic vapors being avoided at this stage of the process, and then distilling and concentrating the resulting liquids so as to remove the remaining impurities.

In testimony whereof we have signed this specification.

ELOI RICARD.
HENRI MARTIN GUINOT.